Jan. 28, 1930.        A. E. ANDERSON        1,745,139
AUTOMATIC RECLOSING CIRCUIT BREAKER SYSTEM
Filed Jan. 16, 1929

Inventor
Arvid E. Anderson
by Charles E. Tullar
His Attorney

Patented Jan. 28, 1930

1,745,139

UNITED STATES PATENT OFFICE

ARVID E. ANDERSON, OF LANSDOWNE, PENNSYLVANIA, ASSIGNOR TO GENERAL ELECTRIC COMPANY, A CORPORATION OF NEW YORK

AUTOMATIC RECLOSING-CIRCUIT-BREAKER SYSTEM

Application filed January 16, 1929. Serial No. 332,856.

My invention relates to automatic reclosing circuit breaker systems and particularly to a system for controlling the reclosing of a circuit breaker between a source of current and a load circuit to which a large motor load is adapted to be connected automatically when the load circuit voltage is above a predetermined value.

One object of my invention is to provide in such a system an improved arrangement whereby the circuit breaker between the source and the load circuit is automatically reclosed after a very short time interval if the fault which causes the breaker to open is removed soon enough to prevent the counter electromotive force of the motors from decreasing below a predetermined value during said time interval. With such an arrangement a fault in one of the motors, which effects its immediate disconnection from the load circuit, does not seriously affect the supply of current to the other motors.

Another object of my invention is to provide an arrangement whereby the circuit breaker between the supply and load circuits is reclosed in response to the impedance of the load circuit if the fault on the load circuit is such as to cause the voltage thereof to decrease below a predetermined value within a predetermined time after the circuit breaker opens.

A further object of my invention is to provide an arrangement which permits the reclosing of the circuit breaker to be controlled in response to the impedance of the load circuit, and under these conditions prevents the voltage across the load circuit from building up to a sufficient value to effect the automatic starting sequence of the motors until after the circuit breaker between the source and the load circuit has been closed.

My invention will be better understood from the following description, when taken in connection with the accompanying drawing, and its scope will be pointed out in the appended claims.

Figure 1:
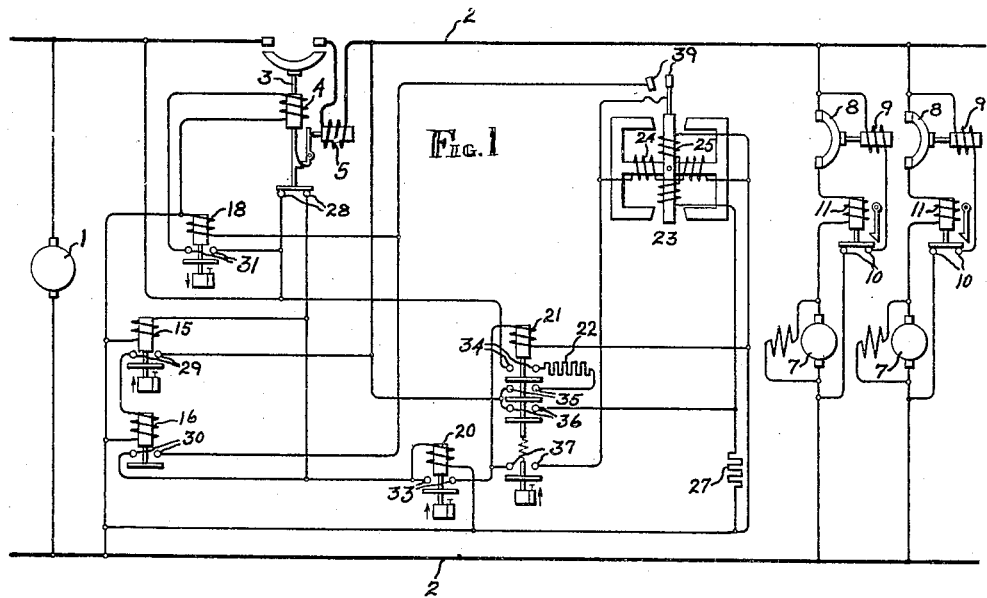
Figure 2:
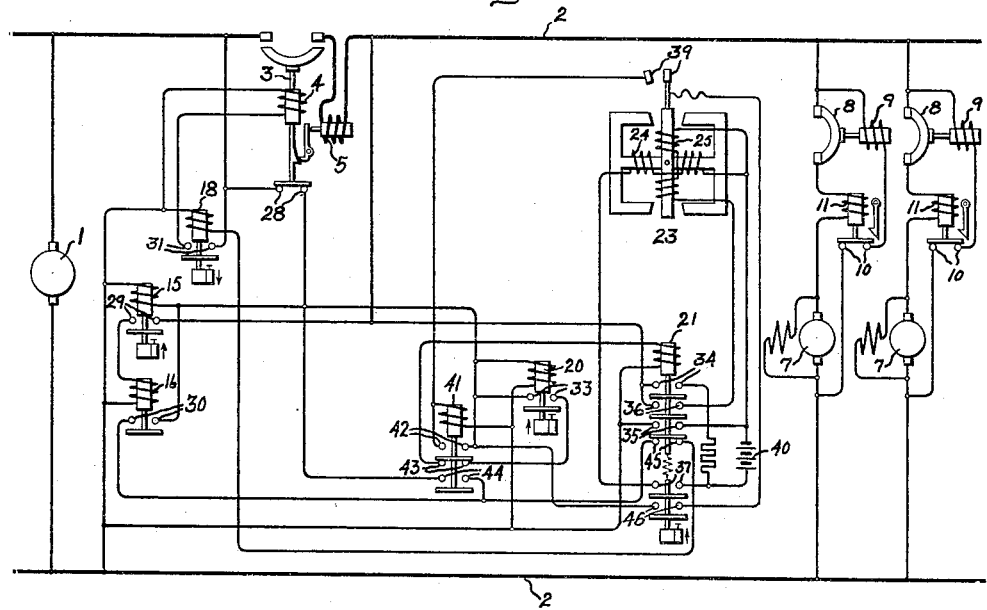

In the accompanying drawing, Fig. 1 is a diagrammatic showing of an automatic reclosing circuit breaker system embodying my invention and Fig. 2 is a diagrammatic showing of a modification of the arrangement shown in Fig. 1.

Referring to Fig. 1, a suitable source of current 1 is arranged to be connected to a load circuit 2 by means of a circuit breaker 3 which may be of any suitable type, examples of which are well known in the art. As shown, the circuit breaker is of the well known latched-in type and is provided with a closing coil 4 and a trip coil 5.

A plurality of motors 7 are respectively connected across the load circuit by means of suitable circuit breakers 8. Each circuit breaker is provided with suitable automatic control means whereby the associated motor may be automatically connected across the load circuit when the voltage thereof is above a predetermined value and may be disconnected from the load circuit whenever the load circuit voltage decreases below a predetermined value and, in addition, may be disconnected and prevented from being automatically reconnected to the load circuit when the current through the motor exceeds a predetermined value. As shown, each circuit breaker 8 is provided with a closing coil 9 which is permanently connected across the load circuit 2 by means of contacts 10 of an overcurrent relay 11 which is so connected that it is energized in accordance with the current through the associated motor 7. The overcurrent relays 11 are arranged in any suitable manner so that when they are sufficiently energized to open their respective contacts 10, the contacts remain open until they have been reset by hand.

It is to be understood that the arrangement shown in the drawing is merely a diagrammatic showing of an arrangement for accomplishing this result and that any other well known arrangement for accomplishing this result may be provided.

When circuit breaker 3 is opened by a fault, it is desirable to have the circuit breaker reclosed automatically after a very short interval if the fault is removed quickly enough to prevent the counter-electromotive force of the motors connected across the load circuit 2 from decreasing below a predetermined value within a predetermined time. In the particular embodiment of my invention shown in the drawing I accomplish this result by providing a time relay 15 which is arranged to be energized in response to the opening of the circuit breaker 3. After the relay 15 has been energized a predetermined time it effects the connection of the voltage relay 16 across the load circuit 2. If the load circuit voltage is above a predetermined value when the relay 16 is connected across it, the relay 16 completes an energizing circuit for the hesitating control relay 18 which, in turn, completes an energizing circuit for the closing coil 4 of the circuit breaker 3.

If, however, the fault is of such a character that it causes the load circuit voltage to decrease below the pick-up value of the voltage relay 16 before the time relay 15 effects the connection of the relay 16 across the load circuit, the reclosing of the circuit breaker is then controlled in response to the impedance of the load connected to the load circuit, after the circuit breaker has been opened a longer interval of time. This result is obtained in the arrangement shown in Fig. 1 by means of a time relay 20 which is arranged to be energized in response to the opening of the circuit breaker 3. After the time relay 20 has been energized a predetermined length of time, which is longer than the time setting of relay 15 and which is sufficient to allow the counter electromotive force of the connected motor to decrease to substantially zero, the relay 20 completes an energizing circuit for the control relay 21 which when energized connects a suitable current limiting device such as a load indicating resistor 22 in series between the source 1 and the load circuit 2 so that a small current flows through this resistor 22 to the load circuit 2. The control relay 21 also controls the connections of a suitable reclosing relay 23 so that it is energized in accordance with the impedance of the load connected to the load circuit. As shown in the drawing, the reclosing relay 23 is arranged so that it responds to the voltage drop produced across the load circuit by the current supplied thereto through the load indicating resistor 22. The voltage responsive relay 23 may be of any suitable type examples of which are well known in the art. As shown, the relay is of the well known polarized type comprising a magnetizing winding 24 and an operating winding 25 which are respectively connected across the source and the load circuit 2 by the control relay 21 when it is energized. Preferably the relay 21 is designed in a suitable manner so that it does not complete the circuit through the magnetizing winding 24 and contacts 39 until after the circuit through the operating winding 25 has been completed.

In order to prevent the load circuit voltage from increasing to a sufficient value to effect the closing of the circuit breakers 8 associated with the motors 7 during the load indicating operation of the reclosing equipment, the control relay 21 is also arranged when energized to connect a loading resistor 27 across the load circuit 2. The resistance of this loading resistor is of such a value with respect to the load indicating resistor 22 that it prevents the voltage drop produced across the load circuit by the current supplied thereto through the resistor 22 from building up to a relatively high value. The resistance of the resistor 22 however is high relatively to the normal full load resistance so that it does not cause an excessive current to flow through the circuit breaker 3 at the instant it closes at which time the resistor 27 may still be connected across the load circuit.

The operation of the arrangement shown in Fig. 1 is as follows:

Let it be assumed that the circuit breakers 3 and 8 are closed and a fault occurs in one of the motors 7 which causes the trip coil 5 to effect the opening of the circuit breaker 3 and the overcurrent relay 11 associated with the faulty motor to open its respective contacts 10. The overcurrent relay 11 by opening its contacts 10 deenergizes the closing coil 9 of the associated circuit breaker 8 so that the faulty motor is immediately disconnected from the load circuit 2.

When the circuit breaker 3 opens so that its auxiliary contacts 28 are closed, circuits are completed directly across the source 1 for the time relays 15 and 20. After a very short time interval, relay 15 closes its contacts 29 and connects the coil of the voltage relay 16 directly across the load circuit 2. If the counter-electromotive force of the motors 7 which are still connected to the load circuit 2, is above a predetermined value when the relay 16 is connected across the load circuit, the relay 16 immediately closes its contacts 30 and completes through auxiliary contacts 28 an energizing circuit for the hesitating control relay 18. The closing of the contacts 31 of the hesitating control relay 18 connects the closing coil 4 of the circuit breaker 3 directly across the source 1 so that the circuit breaker 3 closes and reconnects the source 1 directly to the load circuit 2.

When the circuit breaker 3 closes, the relays 15, 16, 18 and 20 and the closing coil 4 are subsequently deenergized in response to the opening of the auxiliary contacts 28 on the circuit breaker.

If the load circuit voltage is not sufficient to cause the relay 16 to close its contacts 30 when the time relay 15 connects the relay 16 across the load circuit, the time relay 20 after a predetermined time, closes its contacts 33 and completes through the auxiliary contacts 28 on the circuit breaker 3, an energizing circuit for the control relay 21. When the control relay 21 is energized, the load indicating resistor 22 is connected between the source 1 and the load circuit 2 by means of the relay contacts 34 and 35, the operating winding 25 of the reclosing relay and the loading resistor 27 are immediately connected across the load circuit 2 by means of the relay contacts 36, and after a predetermined time interval the magnetizing winding 24 of the reclosing relay is connected across the source 1 by means of the relay contacts 37. When the impedance of the load connected to the load circuit exceeds a predetermined value the reclosing relay 23 closes its contacts 39 and completes an energizing circuit for the hesitating control relay 18, through the auxiliary contacts 28 on the circuit breaker 3, contacts 33 of the relay 20, and contacts 37 of the relay 21. The relay 18 then effects, in the manner above described, the closing of the circuit breaker 3.

As soon as the circuit breaker 3 closes, the control relays are restored to their normal positions in response to the opening of the auxiliary contacts 28 on the circuit breaker.

In the modification of my invention shown in Fig. 2, the load indicating current which is supplied to the load circuit when the circuit breaker 3 is opened is supplied from an auxiliary low voltage source 40 instead of from the main source 1. By using such an auxiliary source which has a voltage below that required to operate the circuit breakers 8, it is possible to eliminate the loading resistor 27 since it is impossible for the load circuit voltage to build up to a sufficient value to close the circuit breakers 8 during the load indicating operation. When such a low voltage source is used, however, it is necessary to disconnect this auxiliary source from the load circuit voltage before the circuit breaker 3 is closed. In the modification shown in Fig. 2 this result is accomplished in the following manner:

When the reclosing relay 23 closes its contacts 39 in response to the load impedance, it completes, through the auxiliary contacts 28 on the circuit breaker 3 and contacts 46 of the relay 21, an energizing circuit for a control relay 41. This control relay by closing its contacts 42 completes a locking circuit for itself which is independent of the contacts 39 of the reclosing relay 23 and contacts 46 of relay 21 so that the control relay remains energized after the reclosing relay opens its contacts 39. The control relay 41 by opening its contacts 43 which, in this modification of my invention, are connected in series with the contacts 33 of the time relay 20 interrupts the energizing circuit for the control relay 21, so that this relay by opening its contacts 34, 35 and 36 disconnects the auxiliary source 40 and coil 25 of relay 23 from across the load circuit 2. As soon as the control relay 21 reaches its deenergized position a circuit is then completed through auxiliary contacts 28 on the circuit breaker 3, contacts 44 of the relay 41 and contacts 45 of the relay 21 for the hesitating control relay 18. The energization of the control relay 18 then effects the closing of the circuit breaker 3 in the manner above described.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, a supply circuit, a load circuit, a circuit breaker connecting said circuits, means for opening said circuit breaker, and means for effecting the immediate reclosing of the circuit breaker after it has been open a predetermined time if the voltage across said load circuit is above a predetermined value after said predetermined time has elapsed and for effecting the reclosing of said circuit breaker in response to the impedance of the load circuit when the voltage across the load circuit remains below said predetermined value after said predetermined time has elapsed.

2. In combination, a supply circuit, a load circuit including a plurality of motors connected thereto, a circuit breaker connecting said circuits, means for opening said circuit breaker, and means for effecting the immediate reclosing of said circuit breaker after it has been open a predetermined time if the counter-electromotive force of the load is above a predetermined value after said predetermined time has elapsed and for effecting the reclosing of said circuit breaker in response to the impedance of the load connected to said load circuit if the counter-electromotive force of the load is below said predetermined value after said predetermined time has elapsed.

3. In combination, a supply circuit, a load circuit including a plurality of motors connected thereto, a circuit breaker connecting said circuits, means for opening said circuit breaker, means for effecting the immediate reclosing of said circuit breaker after it has been open a predetermined time if the counter-electromotive force of the load is above a predetermined value after said predetermined time has elapsed, means responsive to the opening of said circuit breaker for completing a relatively high impedance connection between said circuits after said circuit breaker has been open a longer predetermined time, and means controlled in accordance with the current supplied to the load circuit through the high impedance connection for controlling the reclosing of said circuit breaker.

4. In combination, a supply circuit, a load circuit, a circuit breaker connecting said circuits, means for opening said circuit breaker, means for effecting the immediate reclosing of said circuit breaker after it has been open a predetermined time if the voltage across the load circuit is above a predetermined value after said predetermined time has elapsed, means responsive to the opening of said circuit breaker for completing a relatively high impedance connection between said circuits, voltage responsive means for effecting the reclosing of said circuit breaker, and means for rendering said voltage responsive means responsive to the voltage drop produced across the load circuit by the current supplied thereto through said high impedance connection after said circuit breaker has been open a longer predetermined time.

5. In combination, a supply circuit, a load circuit, a circuit breaker connecting said circuits, means for opening said circuit breaker, two voltage relays responsive to different voltages, means responsive to the opening of said circuit breaker for connecting one of said relays across said load circuit after said circuit breaker has been open a predetermined length of time and for connecting the other of said relays across said load circuit after it has been open a different predetermined length of time, and means controlled by said relays for closing said circuit breaker when the voltages across said relays exceed predetermined values.

6. In combination, a supply circuit, a load circuit, a circuit breaker connecting said circuits, overload responsive means for opening said circuit breaker, two voltage relays responsive to different voltages, means responsive to the opening of said circuit breaker for connecting the relay which responds to the higher voltage across the load circuit after the circuit breaker has been open a predetermined length of time, current limiting means, means responsive to the opening of said circuit breaker for connecting said current limiting means between said circuits and for connecting the other relay across said load circuit after said circuit breaker has been open a longer predetermined length of time, and means controlled by said relays for closing said circuit breaker when the voltages across said relays exceed predetermined values.

7. In combination, a supply circuit, a load circuit including a plurality of motors connected thereto, a circuit breaker connecting said circuits, means for opening said circuit breaker, means for effecting the immediate reclosing of said circuit breaker after it has been open a predetermined time if the counter-electromotive force of the load is above a predetermined value after said predetermined time has elapsed and means for completing a relatively high impedance connection between said circuits and for effecting the reclosing of the circuit breaker in accordance with the current supplied to the load circuit through said high impedence connection after said circuit breaker has been open long enough to permit the counter-electromotive force of the load to decrease a predetermined value.

8. In combination, a supply circuit, a load circuit including a plurality of motors connected thereto, a circuit breaker connecting said circuits, overload responsive means for opening said circuit breaker, and means for effecting the immediate reclosing of said circuit breaker after it has been open a predetermined time if the counter-electromotive force of the load is above a predetermined value after said predetermined time has elapsed and means for completing a relatively high impedance connection between said circuits and for effecting the reclosing of the circuit breaker in response to the voltage drop produced across the load circuit by the current supplied thereto through said high impedance connection after said circuit breaker has been open long enough to permit the counter-electromotive force of the load to decrease to substantially zero.

9. In combination, a supply circuit, a load circuit, an overload circuit breaker connecting said circuits, a plurality of motors connected to said load circuit, an overload and undervoltage circuit breaker between each motor and the load circuit, and means for effecting the immediate reclosing of said first mentioned circuit breaker after it has been open a predetermined time if the counter-electromotive force of the motors connected to the load circuit is above a predetermined value after said predetermined time has elasped and for effecting, after another predetermined time sufficient to permit the counter-electromotive force to decrease below a predetermined low voltage, the reclosing of said first mentioned circuit breaker in response to the impedance of the load connected to the load circuit if said counter-electromotive force is below said predetermined value after said first mentioned predetermined time has elapsed.

10. In combination, a supply circuit, a load circuit including voltage responsive means permanently connected thereto for effecting the connection of additional load to said load circuit when the load circuit voltage increases above a predetermined value, a circuit breaker connecting said circuits, means for opening said circuit breaker, means responsive to the opening of said circuit breaker for effecting a relatively high impedance connection between said circuits and a relatively low impedance across said load circuit, and means responsive to the voltage across said load circuit for controlling the reclosing of said circuit breaker.

11. In combination, a supply circuit, a load circuit including voltage responsive means permanently connected thereto for effecting the connection of additional load to said load circuit when the load circuit voltage increases above a predetermined value, a circuit breaker connecting said circuits, overload responsive means for opening said circuit breaker, a voltage relay, means controlled by said relay for reclosing said circuit breaker when the voltage impressed thereon is above a predetermined value, a high resistance, a loading resistance, and means responsive to the opening of said circuit breaker for connecting said relatively high resistance in series with said circuit and said low resistance and said relay in parallel with said load circuit.

12. In combination, a supply circuit, a load circuit including voltage responsive means permanently connected thereto for effecting the connection of additional load to said load circuit when the load circuit voltage increases above a predetermined value, a circuit breaker connecting said circuits, overload responsive means for opening said circuit breaker, reclosing means for closing said circuit breaker in response to the load connected to said load circuit, and means responsive to the opening of said circuit breaker for controlling the voltage across said load circuit after said circuit breaker has been open a predetermined time so that it does not increase sufficiently to effect the operation of said voltage responsive means.

13. In combination, a supply circuit, a load circuit including a plurality of motors, a circircuit breaker connecting said circuits, means for opening said circuit breaker, and means responsive to the counter electromotive force of said motors for effecting the reclosure of said circuit breaker when the counter electromotive force is above a predetermined value.

14. In combination, a supply circuit, a load circuit including a plurality of motors, a circuit breaker connecting said circuits, means for opening said circuit breaker, and means for reclosing said circuit breaker when the counter electromotive force of said motors is above a predetermined value including a relay responsive to substantially normal voltage and means responsive to the opening of said circuit breaker for connecting said relay across said load circuit.

15. In combination, a supply circuit, a load circuit, a circuit breaker connecting said circuits, means for opening said circuit breaker, a relatively high impedance connection between said circuits when said circuit breaker is open, means controlled by the current supplied to the load circuit through said high impedance connection for controlling the reclosing of said circuit breaker, and means connected across said load circuit for maintaining the load circuit voltage below a predetermined value while current is being supplied to said load circuit through said relatively high impedance connection.

16. In combination, a supply circuit, a load circuit, a circuit breaker connecting said circuits, means for opening said circuit breaker, a relatively high impedance connection between said circuits when said circuit breaker is open, means controlled by the current supplied to the load circuit through said high impedance connection for controlling the reclosing of said circuit breaker, a relatively low impedance, and means controlled by said circuit breaker for connecting said low impedance across said load circuit so as to maintain the load circuit voltage below a predetermined voltage after said circuit breaker has been open a predetermined time.

17. In combination, a supply circuit, a load circuit including a plurality of motors, a circuit breaker connecting said circuits, means for opening said circuit breaker, means responsive to the counter electromotive force of said motors for effecting the reclosure of said circuit breaker if said counter electromotive force remains above a predetermined value after said circuit breaker is opened, and means for effecting the reclosing of said circuit breaker in response to the impedance of the load connected to said load circuit if the counter electromotive force of said motors is below said predetermined value after said circuit breaker is opened.

In witness whereof, I have hereunto set my hand this 11th day of January, 1929.

ARVID E. ANDERSON.